United States Patent [19]
White

[11] 4,011,378
[45] Mar. 8, 1977

[54] AROMATIZED POLYACETYLENES

[75] Inventor: Dwain M. White, Schenectady, N.Y.
[73] Assignee: General Electric Company, Schenectady, N.Y.

[22] Filed: June 29, 1972
[21] Appl. No.: 267,389
[52] U.S. Cl. .................. 526/19; 428/411; 526/13; 526/46; 526/54
[51] Int. Cl.$^2$ .................. C08F 9/00; C08G 25/00
[58] Field of Search .................. 260/47 UP, 94.1; 526/12, 19, 13, 46, 54, 21

[56] References Cited

UNITED STATES PATENTS 3,300,456 1/1967 Hay .................. 260/88.2

*Primary Examiner*—Christopher A. Henderson
*Attorney, Agent, or Firm*—F. Wesley Turner; Joseph T. Cohen; Jerome C. Squillaro

[57] ABSTRACT

Polyacetylenes, either homopolymers or copolymers, are rendered more soluble and/or more thermally stable without destroying their film-forming properties and with minimal decrease in their high carbon content by reacting them with one or more 2,3,4,5-tetrasubstituted cyclopentadiones commonly called tetracyclones. These latter compounds, together with the acetylenic groups of the polymer, undergo a cyclization reaction to produce a 3,4,5,6-tetrasubstituted 1,2-phenylene moiety in the polymer backbone. Because of their high thermal stability these polymers are especially useful as binders for graphite fibers in making graphite composites or to produce films or coatings for high temperature applications.

8 Claims, No Drawings

AROMATIZED POLYACETYLENES

This invention relates to aromatized polyacetylenes, i.e., polyacetylenes, either homopolymers are copolymers of diethynyl compounds, wherein at least 15 percent of the ethynylene groups of the polymer have been converted to 3,4,5,6-tetrasubstituted 1,2-phenylene groups by reaction with a 2,3,4,5-tetrasubstituted cyclopentadienone, hereinafter called by the commonly abbreviated name — a tetracyclone. More particularly, this invention relates to polymers whose repeating units have at least one of the formulae:

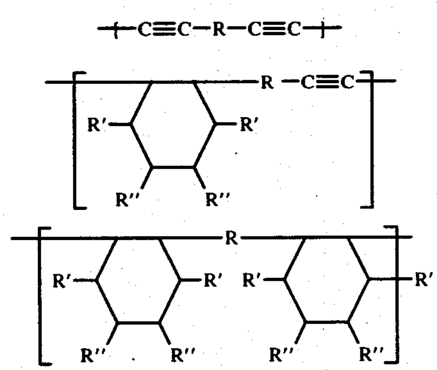

of which no more than 85% have formula (a), where each R is the residue other than the ethynylene groups of a solvent soluble acetylenic polymer whose repeating unit have formula (a), each R', independently, is lower alkyl, lower alkoxycarbonyl, phenyl or halophenyl and each R'', independently, is phenyl or halophenyl.

Polyacetylenes are relatively new polymers having many interesting and desirable properties. They were first described by Allan S. Hay in J. Org. Chem. 25, 1275 (1960) and 27, 3320 (1962). Subsequently, a much broader class of polyacetylenes was disclosed and claimed in Hay's U.S. Pat. Nos. 3,300,456, 3,332,916 and 3,594,175. Using Hay's process of oxidatively coupling compounds having two acetylenic groups, Sladkov et al. likewise prepared polyacetlyenes which they described in Bull. Acad. Sci., U.S.S.R. — Div. Chem. Sci., English Translation [7] 1220 (1963). All of these polymers and copolymers described in this prior art have, as a common property, a butadiynylene group, i.e., —C ≡ C-C ≡ C—, dispersed along the polymer backbone. They also have in common the fact that they are formed by oxidatively coupling of organic compounds having two ethynyl groups, i.e., —C ≡ CH. In the oxidative coupling reaction, thoroughly described by Hay in his above patents and publications, the hydrogen is removed from the ethynyl groups by the oxidation reaction to form water and one of the resulting ethynylene groups of one molecule is joined to one of the resulting ethynylene groups of another molecule to form the butadiynylene groups of the polymer molecule. It is these latter groups which cause the polymers to be very thermally unstable and photosensitive and which tend to make the polymer difficulty soluble in commmon solvents for polymers.

It is obvious that these polyacetylenes are entirely different in kind than polymers containing isolated ethynylene groups in the polymer molecule. Typical of such polymers are the polyesters obtained by esterification of an acetylene dicarboxylic acid and a glycol or esterification of a polycarboxylic acid with an alkynediol and polyethers obtained by the reaction of acetylenic glycols with dialkyl acetals or with alkyl halohydrins. These polymers have ethynylene, but not butadiynylene groups, along the polymer backbone. Such polymers are not included in the term polyacetylenes.

Hay, in his above patents, describes uses for the polyacetylenes which make use of their thermal instability, e.g., coating a substrate with a solution of the polyacetylene and thereafter thermally decomposing the coating under controlled conditions to obtain a resistor of the desired electrical properties. In his U.S. Pat. No. 3,594,175, he describes a means of increasing the solubility in common solvents by either making the polyacetylenes from dipropargyl ethers of dihydric phenols or copolymerizing the diethynyl compounds with the dipropargyl ethers. In the same patent he also describes the very interesting application for the polyacetylenes which make use of their photosensitive properties.

C. M. Krutchen, in his copending application, Ser. No. 352,923, filed Apr. 20, 1973 now U.S. Pat. No. 3,852,235, issued Dec. 3, 1974 as a continuation-in-part application of the then copending but now abandoned application. Serial No. 86,280, filed November 2, 1970, describes means for converting the polyacetylenes into fibres which are thereafter, because of their thermal instability, readily converted into carbon or graphite fibers. Because of the extremely high carbon content and because the thermal decomposition can be carried out in a controlled fashion, the polyacetylenes are readily converted into carbon and graphite fibers in a higher yield and by a more rapid process than can the usual organic polymers previously used for making carbon and graphite fibers. In my copending application Ser. Nos. 327,427, filed Jan. 29, 1973 now U.S. Patent No. 3,821,153, issued June 28, 1974 as a divisional application and Ser. No. 330,497, filed Feb. 8, 1973 now U.S. Pat. 3,816,374, issued June 11, 1974 as a continuation-in-part application of my then copending but now abandoned application, Ser. No. 118,467, filed Feb. 24, 1971, now abandoned. I disclose a particular terpolymer suitable for making the carbon and graphite fibers. As this prior art shows, there are many uses and interesting applications for the polyacetylenes. However, because of the extremely high carbon content, it would be especially desirable if polymers could also be prepared having this same high carbon content but not possessing the thermal instability.

It has been known for a long time that tetracyclones would react with simple compounds containing one or two ethynylene groups. Dilthey et al., Chem. Ber. 68, 1159 (1935), describes the reaction of tetraphenylcyclone with diphenylbutadiyne to give 2,3,4,5,6-pentaphenyltolane, i.e., the tetracyclone reacted with one but not both of the ethynylene moieties of the butadiynylene group. Ried et al., Chem. Ber. 93, 1769 (1960) likewise reacted tetracyclones with diphenylbutadiyne and obtained corresponding tolanes. However, the same tetracyclones when reacted with compounds containing two ethynylene groups separated by an intervening carbon chain, for example, an aromatic compound having two ethynyl groups on different carbon atoms of the aromatic ring could both be reacted with the tetracyclone. This was also reported in a review article on the chemistry of cyclopentadienones by Ogliaruso et al., Chem. Rev. 65, 261 (1965) on page 337. However, in a later paper with Becker, J. Org. Chem. 30, 3354 (1965), Ogliaruso reported that when heated in a sealed tube to 325°, two moles of tetraphenylcyclone could be reacted with one mole of diphenylbutadiyne to produce the corresponding octaphenylquaterphenyl.

Ogliaruso et al. in J. Org. Chem. 28, 2725 (1963) had prepared bistetracyclones and reacted them with two moles of a compound containing one ethynylene group. Ried et al. in an extension of their work mentioned above, reported the first preparation of a polymer by reacting a bistetracyclone with a diethynyl benzene in Naturwiss. 53, 306 (1966). Stille and coworkers likewise reported the making of polymers from bistetracyclones and diethynyl compounds in J. Polym. Sci. A-1, 5, 2721 (1967) and extended this work to include the polymers from bis-2-pyrones and diethynyl compounds in Macromol. 2, 85 (1969). A review of the work on the cyclization of unsaturated compounds is found in a review article on polyphenyls and polyphenylenes by Speight et al. in Rev. Macromol. Chem. 6, 295 (1971) beginning on page 354.

Although these polymers had the desired very high carbon content, solubility in ordinary solvents and thermal stability, they suffer from the fact that the required bistetracyclones or bispyrones are extremely expensive since they cannot be prepared from readily available materials. Although many materials are known to readily react with the ethynylene groups, I have unexpectedly found that the tetracyclones form a unique class of compounds that can be reacted with he polyacetylenes to produce thermally stable, solvent soluble polymers. Although the other materials will react with the polymers, only crosslinked materials are obtained. This is true even for pyrones which is surprising in view of the fact that bispyrones could be used to make polymers from diethynyl compounds. Materials which I have tried to react with polyacetylenes include: anthracene, phenanthrene, 2,4-diphenyl furan, 1,4-diphenylbutadiene, -1,6-diphenylbutatriene-, hexachlorocyclopentadiene, coumarin, $\alpha$-carboethoxypyrone, $\beta$-carboethoxy-$\delta$phenylpyrone, 2-pentyl-3,4-diphenylcyclopentadiene dimer, 2-methyl-3,4-diphenylcyclopentadiene dimer. It will be noted that even tricyclones could not be used in place of the tetracyclones, even though in both cases the dimer depolymerizes during heating to the monomer.

Since the cyclization reaction by which my polymers are formed, involves only one or both ethynylene moieties of the butadiynylene groups, I can use any of the solvent-soluble acetylenic polymers of the prior art, for example, any of the acetylenic polymers disclosed in the above-mentioned literature and patent references which are hereby incorporated by reference for a teaching of the wide variety of polyacetylenes which are readily available. For example, Hay in his U.S. patent 3,300,456, discloses polyacetylenes corresponding to the formula,

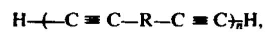

$$H\!\left(-C\equiv C-R-C\equiv C\right)_{n}H,$$

wherein $n$ is an integer representing a number of repeating units joined together to form a polymer molecule and is at least two but usually represents a value of at least 10 and is more probably at least 50 and the hydrogen atoms are on the terminal ethynylene groups of the polymer molecule, and R is a divalent organic radical which can be an aliphatic or aromatic radical wherein one or more of the hydrogens of the aliphatic or aromatic nucleus has been substituted by, for example, halogen, $$-OH,\ -OR,\ -O-\overset{O}{\overset{\|}{C}}-R,\ -\overset{O}{\overset{\|}{C}}-OR,\ -\overset{O}{\overset{\|}{C}}-R,\ -\overset{O}{\overset{\|}{C}}-NH_2,\ -\overset{O}{\overset{\|}{C}}-NHR,\ -\overset{O}{\overset{\|}{C}}-NR_2,$$

$-CN$, $-SH$, $-SR$, $-SSH$, $-SSR$, $-SOR$, $-NO_2$, $-SO_2R$, $-NH_2$, $-NHR$, $-NE_2$, etc. In all of the above formulas, R may be a monovalent organic radical such as defined above. From a practical standpoint of being readily available at a reasonable cost, the polymers are generally polymers of diethynylalkanes or diethynylarenes, preferably diethynylbenzenes, diethynylbiphenyls, bis(ethynylphenyl)ether, etc.

Hay, in his U.S. Pat. No. 3,332,916, discloses heteroatom containing acetylenic polymers having the formula,

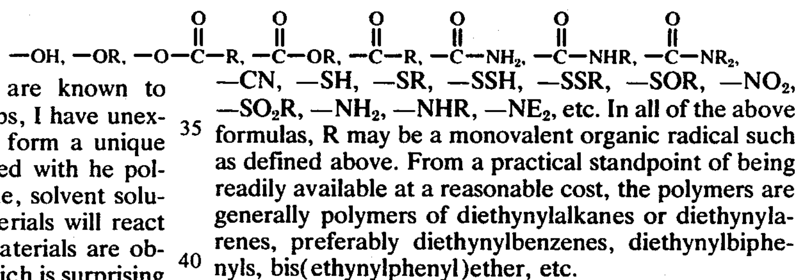

$$H\left[\left(C\equiv C-R'-C\equiv C\right)\!\left(M-C\equiv C-R'-C\equiv C\right)_{n}\right]_{m}H,$$

where M is a polyvalent radical selected from the group consisting of $-Hg-$, $-\underset{|}{Tl}R-$, $-\underset{|}{Si}(R)_2$, $-\underset{|}{Ge}(R)_2$, $-\underset{|}{Sn}(R)_2$, $-\underset{|}{Pb}(R)_2$, $-\underset{|}{P}R$, $-\underset{|}{As}R$, $-\underset{|}{Sb}R$, $-\underset{|}{Bi}R$, $-S-$, $-Se-$, $-Te-$, $-\underset{|}{Ni}(AsR_3)_2$, $-\underset{|}{Ni}(PR_3)_2$, $-\underset{|}{Ni}(SbR_3)_2$, $-\underset{|}{Pd}(AsR_3)_2$, $-\underset{|}{Pd}(PR_3)_2$, $-\underset{|}{Pd}(SbR_3)_2$, $-\underset{|}{Pt}(AsR_3)_2$, $-\underset{|}{Pt}(PR_3)_2$ and $-\underset{|}{Pt}(SbR_3)_2$, where R is a monovalent hydrocarbon radical, R' is a divalent hydrocarbon radical, and n is a positive integer and is at least one and m is a positive integer and is at least two. Here again, from a practical standpoint, R' is generally alkylene, preferably lower alkylene or arylene, preferably phenylene.

The polyacetylenes disclosed by Hay in his U.S. Pat. No. 3,594,175 have one of the formulas

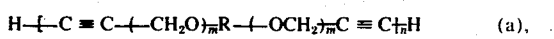

wherein $m$ is one of the integers 0 and 1; $n$ is an integer and is at least 10 and R is selected from the group consisting of arylene, including lower alkyl substituted arylene, haloarylene, including lower alkyl substituted haloarylene, and, in addition when $m$ is 0, alkylene and when $m$ is 1, —R'—X—R'— where R' is selected from the group consisting of phenylene, halophenylene and lower alkyl substituted phenylene and X is selected from the group consisting of —O—,

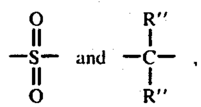

where R'' is selected from the group consisting of hydrogen and lower alkyl, $$H\!-\!\!\!\left[\!-C\equiv C\!-\!CH_2O\!-\!R^a\!-\!OCH_2\!-\!C\equiv C\!-\!\right]_{\!n}\!H \qquad (b),$$

wherein $n$ has the value defined above and $R^a$ is one of the formulae,

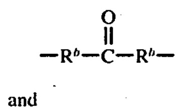

and

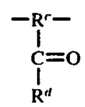

where $R^b$ is arylene, $R^c$ is arenyl, also called artriyl and $R^d$ is alkyl and aryl, c. copolymers having at least 10 repeating units having both formulas (a) and (b); and d. copolymers having at least 10 repeating units having both formulas,

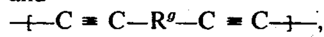

and $$-\!\left[\!-C\equiv C\!-\!R^g\!-\!C\equiv C\!-\!\right]\!-,$$

where $R^f$ is as defined above for R when $m$ is 1 and $R^g$ is alkylene or p-arylene.

Sladkov et al. described polyacetylenes made from dipropargyl ethers of dihydric phenols as well as polyacetylenes prepared from dipropargyl esters of dicarboxylic acids and dipropargyl acetals of aldehydes such as, for example, benzaldehydes. Other suitable polyacetylenes are those found in the scientific journals wherein other investigators have prepared a wide variety of polyacetylenes based on the teachings of Hay. All such polyacetylenes can be used as starting material for preparing my polymers. In addition, Hay in U.S. Pat. No. 3,519,611 describes modified polyacetylenes obtained by reacting a polyacetylene with N-arylsydnones to introduce pyrazole units in the polymer backbone. Such modified polymers still containing some unreacted butadiynylene groups likewise can be used as the polyacetylene for making my polymers.

Of all of the above polyacetylenes, the most readily available are those from diethynylhydrocarbons and dipropargyl ethers of dihydric phenols. In order to have the highest carbon content, the polymers should be made from diethynyl arenes, the most readily ones being diethynylbenzenes. To increase the solubility of the polymers of the latter in solvents, the isomers can be copolymerized together or still further increased by copolymerizing with the dipropargyl ethers. A particularly good one which is effective in low concentrations is the dipropargyl ether of 4,4'-isopropylidenediphenol (Bisphenol A), also called 4,4'-isopropylidenebis(-propargyloxybenzene). For many applications, I prefer to use as my starting polyacetylene, the copolymer obtained by oxidatively coupling a mixture of m-diethynylbenzene, p-diethynylbenzene and 4,4'-isopropylidenebis)propargyloxybenzene), especially those having, on a weight basis, 1–25% p-diethynylbenzene, 60–99% m-diethynylbenzene and 0–35% 4,4'-isopropylidenebis(propargyloxybenzene), i.e., R in the formulae of the repeating units of the polymer are 1–25% p-phenylene, 60–99% m-phenylene and 0–35%

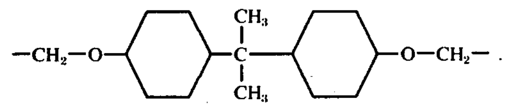

Although I can use any of the tetracyclones, the most readily available tetracyclones are those having the formula,

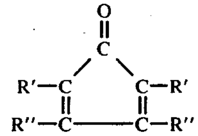

where each R', independently, is lower alkyl, lower alkoxycarbonyl, phenyl or halophenyl and each R'', independently, is phenyl or halophenyl. Typical of the substituents which R' can be, are methyl, ethyl, propyl, isopropyl, the various butyl groups, i.e., n-butyl, isobutyl, cyclobutyl, t-butyl, the various pentyl groups, the various hexyl groups, the various heptyl groups, the various octyl groups, etc., the lower alkoxycarbonyl, i.e., $$R'O\overset{O}{\overset{\|}{C}}-,$$

where R' is lower alkyl, examples of which are given above, or phenyl or halophenyl, i.e., phenyl in which from 1 to 5, preferably 1 to 2 of the hydrogen atoms have been replaced by halogen, preferably chlorine. R'' is phenyl or halophenyl, examples of which have been given above.

Those tetracyclones where each R' independently is lower alkoxycarbonyl are new chemical compounds. They are readily prepared by first reacting benzil or the appropriate halobenzil with the appropriate lower dialkyl ester of 3-oxoglutaric acid, sometimes called acetone dicarboxylic acid, in the presence of a dilute alkali metal hydroxide solution in an alkanol, generally methanol, to produce a partially dehydrated intermediate which is then dehydrated to the tetracyclone. The reaction proceeds readily at room temperature where it is generally run, but may be hastened by heating if desired. The progress of the reaction is easily followed by monitoring the disappearance of the benzil from the reaction medium. The partially dehydrated intermediate is further dehydrated with an anhydride, for example, acetic anhydride in the presence of a small amount of sulfuric acid. These reactions are shown in the following equations where each $R_a$ independently is lower alkyl and each $R_b$ individually is phenyl or halophenyl:

benzenes, chlorobiphenyls, chlorodiphenyl ethers, etc., are excellent solvents for carrying out this reaction. The reaction is carried out, generally using the lowest temperature at which the reaction proceeds at a reasonable rate which is easily monitored by noting the evolution of carbon monoxide.

In the presence of sufficient tetracyclone, reaction between one ethynylene moiety of the butadiynylene group and the tetracyclone proceeds readily to completion for every butadiynylene group of the polymer and the polymer repeating unit are those having formula (b). Since it is the conjugated triple bonds of the butadiynylene groups which render the polymers thermally unstable, the thermostability increases as the degree of this reaction increases. Likewise, the solubility of the polymer, especially noticeable if it is initially only very slightly soluble, increases as the degree of

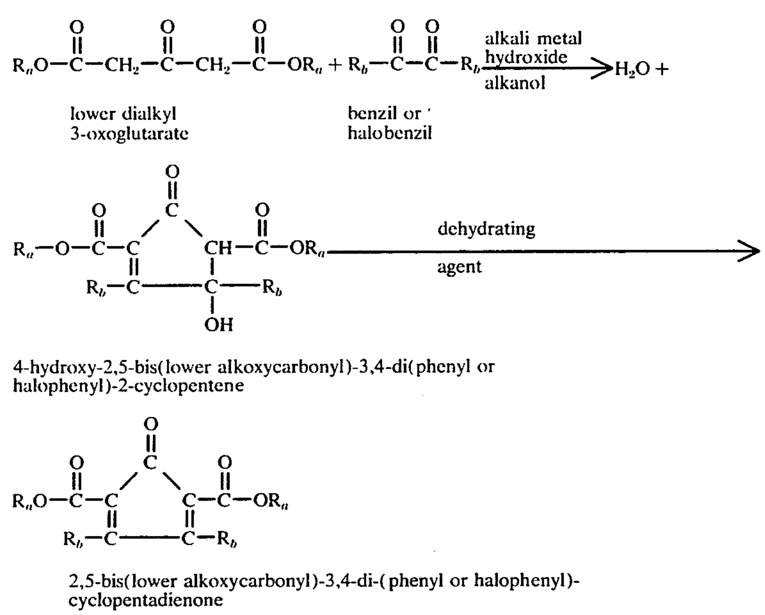

These tetracyclones react with one of the ethynylene moieties of the butadiynylene groups found in the polyacetylenes according to the following scheme:

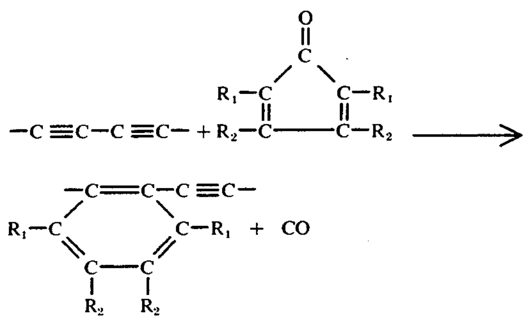

The reaction is carried out at elevated temperatures under an inert atmosphere using a solvent in which the polyacetylene is soluble or at least becomes somewhat soluble at temperatures in the range of 50° to 130° C. in the presence of a free-radical scavenger, e.g., a phenol such as a 2,4,6-trisubstituted phenol. Haloarenes and haloarene ethers especially chloroarenes and chloroarene ethers or mixtures thereof, for example, chlororeaction increases. The temperature necessary to cause this reaction is lowest for 2,5-dialkyl-3,4-diarylcyclones, generally in the range of 130°–150° C. and is highest, generally in the range of 225°–240° C. for the 2,3,4,5-tetraarylcyclones with the 2,5-di(lower alkoxycarbonyl)-3,4-diarylcyclones requiring intermediate temperatures, generally in the range of 180°–200° C. The best temperature to use for cyclizing any particular polyacetylene with any particular tetracyclone is readily determined by rapidly heating the reaction mixture and using that temperature at which a controlled rate of evolution of the carbon monoxide is obtained.

The second ethynylene moiety of the original butadiynylene groups of the polymer can also be reacted with the same or different tetracyclone by heating under the same general conditions above but to a higher temperature than that required for the first reaction for that particular tetracyclone. The reaction does not proceed to completion apparently because of the steric effects of the neighboring adducts. Highest yields in the second reaction are obtained when a tetraarylcyclone is used in which case about 60% of the remaining ethynylene groups (80% of the total) can be reacted with the tetraarylcyclones. Where both ethynylene moieties of the butadiynylene group are reacted, the repeating unit of the polymer has formula (c).

It is obvious that one tetracyclone can be used for the first reaction and a second tetracyclone used for the second reaction. In this case, since the tetraarylcyclones give the highest yield in the second reaction, if one wanted to use a 2,5-dialkyl-3,4-diarylcyclone or a 2,5-di(alkoxycarbonyl)-3,4-diarylcyclone in conjunction with a tetraarylcyclone, the latter, preferably would be used for the second reaction. Although solubility and polymer stability are not generally increased with the degree of this second reaction, oxidative stability at elevated temperature below the thermal decomposition point are improved.

Solutions of the polymers obtained by either reaction are readily cast into films. These solutions also can be used to coat fibers, cloths, papers or mats of carbon or other high impregnate carbon in order to permit the coated article to be molded under heat and pressure into composites or laminates.

In order that those skilled in the art may better understand my invention, the following examples are given by way of illustration and not by way of limitation. In all the examples parts are by weight and temperatures are in degrees centrigrade unless otherwise stated. Where elemental anaylses are given, the determined values are followed by the theoretical values in parentheses. In Examples 5 and 6, the tetracyclone exists as the dimer at room temperature, but readily dissociates during heating to the reaction temperature.

EXAMPLE 1

A mixture of 0.5 g. of a polyacetylene made by oxidatively coupling a mixture of 90% m-diethynylbenzene and 10% p-diethynylbenzene, 0.02 g. of 2,6-dioctadecyl-4-methylphenol, 5 g. of 2,3,4,5-tetraphenylcyclopentadiene and 5 ml. of a mixture of chlorinated biphenyls having 32% chlorine was heated to 300° under a nitrogen atmosphere for 6 hours in a liquid metal bath. At the end of this time, an additional 5 ml. of the chlorinated biphenyl mixture was added to cool the reaction mixture quickly to about 200° and to aid in the removal of the solution from reaction vessel. The solution was added dropwise to 250 ml. of methanol with stirring. After washing with additional methanol to remove unreacted tetracyclone and drying, the polymer weighed 2.83 g. The infrared and nmr spectra were consistent with a polymer structure some of whose repeating units contained 1 cyclized structure and the other units contained 2 such structures. Based on the yield of polymer, each one of the butadiynylene groups of the polymer has reacted with the tetracyclone to form at least one 3,4,5,6-tetraphenyl-1,2-phenylene ring of which 62% had formed 2 such rings. This polymer therefore contained repeating units, 38% having formula (b) and 62% having formula (c), where R is m-phenylene or p-phenylene and each R′ and R″ is phenyl.

EXAMPLE 2

When the above reaction was repeated but using a temperature of 225°, the yield was 1.9 grams showing that all of the butadiynylene groups had reacted with the tetracyclone but that only one of the ethnylene moieties of the butadiynylene group had been cyclized. The presence of the remaining ethynylene group was established by measuring the $13_C$ nmr spectrum.

EXAMPLE 3

When Example 1 was repeated but the heating was initiated at 210° and over a period of 40 minutes raised to 292° and maintained a temperature of 292°–298° for 80 minutes, the product contained 81% (b) units and 19% (c) units as defined in Example 1.

The polymers described above are soluble at 25° in common organic solvents as benzene, chlorinated aromatic liquids, chloroform and tetrachloroethane. Clear, coherent films can be cast from the solutions. Melting point ranges on a hot-stage microscope vary with extent of reaction: for 100% (b) units, 338°–350°; for 81% (b) units — 19% (c) units, 352°–375°C.; for 38% (b) units — 62% (c) units: 360°–375°C. When polymers with only (b) units were heated in air at 10° C./min. weight losses did not occur until approximately 430°, in a nitrogen atmosphere the sample began to lose weight at 460° C.

EXAMPLE 4

Example 1 was repeated but using a polyacetylene obtained by oxidatively coupling a mixture of 82% m-diethynylbenzene, 8% p-diethynylbenzene and 10% 4,4′-isopropylidene bis(propargyloxybenzene), the dipropargyl ether of 4,4′-isopropylidenediphenol. In one case, a high molecular weight polymer was used and in another case a polymer in which sufficient phenylacetylene was used as a chain stopper to obtain a low molecular weight polymer having an average degree of polymerization of 10. In these reactions, 5 ml. of benzene was used in place of the chlorinated biphenyl as solvent which, although it evaporated during the heating of the reaction mixture, did provide an initial liquid phase for the reaction mixture which was maintained even after the evaporation of the benzene. No chlorinated biphenyl was added after the reaction period, so that on cooling a solid mass resulted. This was worked up with acetone but due to the extreme solubility of the resulting polymers, especially that from the low molecular weight initial polymer, even in methanol, it was impossible to recover all of the resulting polymer. Based on the amount of recovered polymer, at least 44% of the repeating units of the resulting polymer of the initially low molecular weight polymer had been converted to (b) units and in the case of the higher molecular weight product, 49% of the repeating units.

EXAMPLE 5

A mixture of 2.48 g. of the polyacetylene of Example 1, 5.72 g. of 2,5-dimethyl-3,4-diphenylcyclopentadienone, 0.05 g. of 2,6-dioctadecyl-4-methylphenol and 40 ml. of chlorobenzene were heated at 130°, the reflux temperature of the reaction mixture, for a period of two hours under a nitrogen atmosphere. The reaction mixture was added dropwise to 450 ml. of acetone, the precipitate separated by filtration, washed and dried to yield 6.72 grams of product. Based on this yield, one of the ethynylne moieties of each butadiynylene group of the initial polymer had been converted to 3,6-dimethyl-4,5-diphenyl-1,2-phenylene groups, i.e., all of the repeating units of the polymer corresponds to formula (b) where each R′ is methyl, each R″ is phenyl and R is m-phenylene or p-phenylene.

EXAMPLE 6

A mixture of 0.25 g. of the polyacetylene of Example 1, 1.69 g. of 2,5-dimethyl-3,4-diphenylcyclopentadienone, 0.01 g. of 2,6-dioctadecyl-4-methylphenol and 2.5 ml. of a chlorinated biphenyl having a chlorine content of 32% was heated at 225° under nitrogen atmosphere for one hour. An additional 5 ml. of the chlorinated biphenyl was added and the reaction mixture precipitated by adding to 500 ml. of acetone. After filtering and drying the precipitate, a yield of 0.85 of polymer was obtained. Based on this yield, each repeating unit of the polymer had at least one 1,2-phenylene group on the backbone and of these 30% had two such units, i.e., 70% of the repeating units had formula (b) and 30% had formula (c) where each R' is methyl and each R'' is phenyl and each R is m-phenylene or p-phenylene.

EXAMPLE 7

Using a polymer similar to that prepared in Example 5 but having only 0.8 of is repeating units cyclized to units corresponding to formula (b) where each R' is methyl and each R'' is phenyl and R is m-phenylene or p-phenylene, further cyclization was carried out as follows: A mixture of 0.71 g. of this polymer, 1.54 g. of 2,3,4,5-tetraphenylcyclopentadienone, 0.02 g. of 2,6-octadecyl-4-methylphenol and 5 ml. of a chlorinated biphenyl having a chlorine content of 32% was heated under nitrogen at 300° for 30 minutes. Upon cooling, a precipitate started to form and acetone was added to complete the precipitation. The polymer was filtered off, dried and redissolved in 15 ml. of chlorobenzene and again precipitated by pouring into acetone. After filtering, washing and drying, a yield of 0.9 g. of product was obtained. The nmr spectrum of this polymer indicated that 60% of the remaining ethynylene moieties had been cyclized to 1,2-phenylene groups, i.e., 60% of the repeating units of the polymer had formula (b) and 40% of the repeating units had formula (c) where each R' is methyl or phenyl, each R'' is phenyl and each R is m-phenylene or p-phenylene.

EXAMPLE 8

This example is a typical preparation to be used in preparing 2,5-bis(lower-alkoxycarbonyl)-3,4-diarylcyclopentadienones. A solution of 34.8 g. of dimethyl 3-oxoglutarate, 21.0 g. of benzil in a 0.5% potassium hydroxide solution in 250 ml. of methanol was allowed to stand under a nitrogen atmosphere with stirring at room temperature. After one hour, the solution had become clear. After 20 hours, a precipitate had formed in the reaction mixture and a sample of the liquid phase showed that no benzil was present. The reaction mixture was poured into 500 ml. of water to precipitate all the product. After filtration, washing and drying, there was obtained 28.82 g. of 4-hydroxy-2,5-bis(methoxycarbonyl)-3,4-diphenyl-2-cyclopentenone. After recrystallization from 200 ml. of benzene, elemental analysis showed: C, 69.5 (68.9); H, 4.9 (4.92). The compound was further identified by its nmr spectrum.

The above intermediate was further dehydrated to the desired tetracyclone by dissolving 22.01 g. of the above intermediate in 40 g. of acetic anhydride to which 3 drops of concentrated sulfuric acid were added. The reaction mixture was heated to obtain a homogeneous solution and allowed to stir ½ hour after removal of the source of heat. The reaction mixture was poured to 450 ml. of water, causing the desired 2,5-bis(methoxycarbonyl)-3,4-diphenylcyclopentadienone to precipitate as crystals which after filtering, washing and drying in a vacuum at 50°, weighed 20.57 g. After recrystallization from acetic acid, the product had a melting point of 162°–164° C. The product was identified by its nmr and infrared spectra.

Elemental analysis is shown: C, 72.2 (72.41); H, 4.7 (4.6). Mass spectrum showed the parent peak, m/e 348.

EXAMPLE 9

A mixture of 0.62 g. of the polyacetylene of Example 1, 2.68 g. of the tetracyclone of Example 8, 0.02 g. of 2,6-octadecyl-4-methylphenol and 10 ml. of o-dichlorobenzene was heated at 180°, the reflux temperature of the reaction mixture, under a nitrogen atmosphere for 2 hours. After cooling, the reaction mixture was added dropwise to a 50–50 methanol-acetone mixture and the precipitate washed with additional acetone and methanol. After drying there was obtained 1.85 g. of polymer. Based on this yield, 80% of the butadiynylene groups of the original polymer had been converted to repeating units having the formula (b), the balance being formula (a) where each R' is methoxycarbonyl, each R'' is phenyl and each R is m-phenylene or p-phenylene.

EXAMPLE 10

A mixture of 2.22 g. of polyacetylene made by oxidatively coupling m-diethynylbenzene, 6.96 g. of the cyclone of Example 8, 0.1 g. of 2,6-octadecyl-4-methylphenol and 60 ml. of a chlorinated biphenyl having 32% chlorine was heated under a nitrogen atmosphere at 185° for 2 hours. The reaction mixture was poured into a mixture of 700 ml. of methanol and 700 ml. of acetone. The product was filtered, washed and dried — yield 4.0 g. Based on this yield, 90% of the initial butadiynylene groups had been cyclized so that 90% of the repeating units had formula (b), the balance being formula (a) where each R' is methoxycarbonyl, each R'' is phenyl and each R is m-phenylene.

All of the polymers from the above examples are readily soluble to at least 10% at room temperature in such commonly available solvents as chloroform, tetrachloroethane, benzene, chlorobenzene and nitrobenzene and can be cast into clear flexible films. These films are thermally stable with the thermostability increasing in the order from those whose R' groups are methoxycarbonyl to those whose R' groups are methyl to those whose R' groups are phenyl. Incipient decomposition does not begin in nitrogen or air below 360° for any of the polymers and goes as high as 460° in nitrogen. When heated in nitrogen at 900°, weight loss increases in the order of those polymers where the R' groups are methyl (27%) to those where the R' groups are phenyl (31%) to those where the R' groups are methoxycarbonyl (34%). In the case where the R' groups are phenyl, i.e., both R' and R'' groups are phenyl, the weight loss is in close agreement for that which would be expected if all of the phenyl groups in the 3 and 6 positions were cleaved from the 1,2-phenylene rings.

Solutions of the polymers in addition to being able to be cast into films readily coat the surface of carbon fibers and can be used to impregnate the tows of such fibers to produce prepregs which can be aligned and molded to produce high performances composites. Best physical properties are obtained from those cyclized polymers where both the R' and R'' groups are phenyl.

Those cyclized polymers where the R′ groups are methoxycarbonyl can be hydrolyzed so that the alkoxycarbonyl groups are converted to carboxyl groups to product polymers having ion exchange properties. If desired, the ester groups can be converted to amide groups.

In addition to increasing the thermostability and solubility, the polymers of this invention likewise have softening points which increase with the degree of reaction. Although the examples have illustrated how to attain a high degree of cyclization, a lower degree of cyclization is attained either by using a shorter reaction time or a deficiency of the tetracyclone. However, when the latter technique is used, the reaction rate is slower and gelation due to thermal instability of the polymer can occur, especially if the tetraarycyclones are used which require generally higher reaction temperatures than the other tetracyclones. In those cases where I have attained a low degree of cyclization, a noticeable improvement in stability and solubility is attained when as low as 15% of the butadiynylene groups have been cyclized to contain at least one cyclic structure, i.e., no more than 85% of the repeating units have formula (a).

Although the above examples have illustrated many modifications of my invention, obviously, other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A polymer all of whose repeating units have the formula

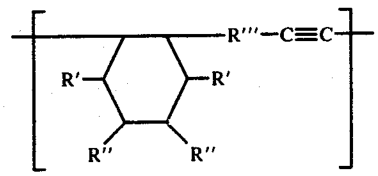

wherein each R‴ is the residue other than an ethynylene group of a solvent-soluble polyacetylene, each R′, independently, is lower alkyl, lower alkoxycarbonyl, phenyl or halophenyl and each R″, independently, is phenyl or halophenyl.

2. The polymers of claim 1, wherein each R′, individually, is phenyl or lower alkyl and each R″ is phenyl.

3. The polymers of claim 2, wherein each R′ and each R″ are phenyl.

4. The polymers of claim 1, wherein R‴ is m-phenylene, p-phenylene or

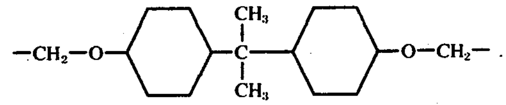

5. The polymers of claim 1, wherein, of the total R‴ groups, 1–25% are p-phenylene, 60–99% are m-phenylene and 0–35% are

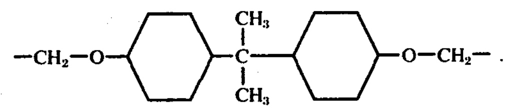

6. The polymers of claim 5, wherein each R′ is lower alkoxycarbonyl and each R″ is phenyl.

7. The polymers of claim 5, wherein each R′ is lower alkyl and each R″ is phenyl.

8. The polymers of claim 5, wherein each R′ and each R″ are phenyl.

* * * * *